INVENTOR:
Garth O. Hall

BY: James R. Hoatson, Jr.
Philip T. Liggett
ATTORNEYS

United States Patent
Hall

[15] 3,668,870
[45] June 13, 1972

[54] COMBINATION HYDRAULIC-PENUMATIC SUSPENSION SYSTEM FOR VEHICLE OCCUPANTS

[72] Inventor: Garth O. Hall, New Berlin, Wis.
[73] Assignee: Universal Oil Products Company, Des Plaines, Ill.
[22] Filed: March 11, 1970
[21] Appl. No.: 18,487

[52] U.S. Cl. ..................60/54.5 R, 60/51, 267/117, 267/126, 92/134
[51] Int. Cl. ..................F15b 7/00, F01b 31/00
[58] Field of Search ..................60/54.5, 51; 267/117, 124, 267/126, 131; 92/134; 138/30, 31; 188/266, 269, 270

[56] References Cited

UNITED STATES PATENTS

| | | | |
|---|---|---|---|
| 2,714,899 | 8/1955 | Kane | 138/31 |
| 3,168,278 | 2/1965 | Ogden | 267/117 |
| 3,300,203 | 1/1967 | Carter et al. | 267/117 |
| 3,474,623 | 10/1969 | Barrett et al. | 60/51 |

*Primary Examiner*—Martin P. Schwadron
*Assistant Examiner*—A. M. Zupcic
*Attorney*—James R. Hoatson, Jr. and Philip T. Liggett

[57] ABSTRACT

A vehicle occupant support suspension system involving a first hydraulic cylinder interposed between an occupant support and the vehicle frame. A connection line leads from the first hydraulic cylinder to a second hydraulic cylinder. The second hydraulic cylinder has a fixed member and a movable member. The movable portion of an air cylinder that has fixed and movable portions is attached to the movable member of the second hydraulic cylinder. The movable member of the second hydraulic cylinder and the movable portion of the air cylinder move together in response to pressure both in the second hydraulic cylinder and in the air cushion.

2 Claims, 2 Drawing Figures

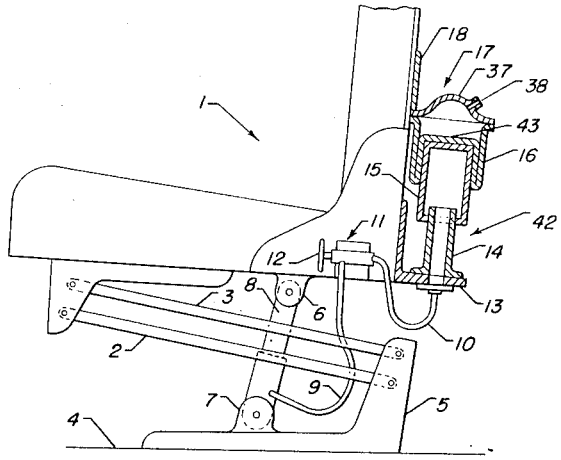

COMBINATION HYDRAULIC-PENUMATIC SUSPENSION SYSTEM FOR VEHICLE OCCUPANTS

This invention relates to a vehicle occupant support suspension system. More particularly, the invention involves a first hydraulic cylinder interposed between an occupant support and the vehicle frame with a connection line leading to a second hydraulic cylinder. The second hydraulic cylinder has a fixed member and a movable member. The movable portion of an air cylinder that has fixed and movable portions is attached to the movable member of the second hydraulic cylinder. The movable member of the second hydraulic cylinder and the movable portion of the air cylinder move together in response to pressure both in the second hydraulic cylinder and in the air cushion.

Currently, vehicle occupant suspension systems involve the suspension of an occupant in either a suspended vehicle seat or a suspended vehicle cab. A hydraulic or a pneumatic fluid is often used to cushion the vehicle occupant in such a suspension system. A hydraulic cushion has several advantages over a pneumatic, or air cushion. Using a hydraulic cushioning system, there is generally more space available beneath the seat because a hydraulic cylinder normally operates at higher pressures than does an air cushion. In a pneumatic cushion, the air or other gas is compressible. This makes it desirable for all the compressible volume of the pneumatic suspension system to be located beneath the seat, that is, between the vehicle seat or other occupant support and the vehicle frame. Since this space is the most congested area in an occupant support system, the large space requirements of a pneumatic cushion is a serious disadvantage. In addition, the damping characteristics of a hydraulic system may be varied. This is normally accomplished by inserting an orifice or other constriction in the line of fluid flow in a hydraulic suspension system. If this constriction is adjustable, the damping characteristics of the system may be varied by the vehicle occupant, depending upon the smoothness of the ride which is likely to be encountered. Such a feature is unavailable in a pneumatic system because air or other gas used in a pneumatic system is compressible, so that flow constriction can achieve only a minimal change in the damping characteristics without changing the effective volume.

On the other hand, air cushions or pneumatic cushioning systems have certain advantages for use in protecting vehicle occupants from vibrations and shocks transmitted through the vehicle frame. One advantage is that vehicles utilizing occupant suspension systems frequently have an internal general purpose pneumatic pressure source. Even if there is no such internal pressure source, virtually all vehicle servicing stations have such pressure sources. As a practical matter, the adjustment of the pneumatic cushioning system may be freely changed while the vehicle is in motion or during servicing stops. Also, the pneumatic pressure source is a great asset in order to adjust the height of the occupant support to accommodate vehicle occupants of different sizes. In addition, such a cushion system is relatively inexpensive, and fluid leaks are not particularly troublesome.

It is an object of the present invention to produce an occupant suspension system which has the advantages of both a hydraulic suspension system and a pneumatic suspension system, but which minimizes the disadvantages of both of the aforesaid systems. Accordingly, the space occupied by the cushioning system of this invention beneath the seat is no greater than that required to accommodate a hydraulic suspension system. While the overall space required for the cushioning system of this invention is not necessarily smaller than either the pneumatic system or the hydraulic system separately, the space occupied beneath the seat, that is, between the seat and the frame, is minimal. A first hydraulic cylinder is interposed between the occupant support and the vehicle frame. The balance of the cushioning system of this invention is connected to this first hydraulic cylinder through a hydraulic fluid connection line. The remaining components of the cushioning system may be positioned on the back of the seat, on the vehicle floor, beneath the vehicle floor, or in any other place remote from the space between the vehicle frame and the seat.

Another object of the invention is to provide a suspension system which has the advantages of a hydraulic cushioning system, but with which the height of the occupant support may be varied by introducing or withdrawing air or other gas. This feature makes the suspension system of this invention particularly appropriate for use in vehicles having a general purpose air pressure supply. This feature is desirable in all other vehicles since a general purpose air pressure supply is at hand at virtually all vehicle service stations.

Another object of the invention is to produce a cushioning system in which the natural frequency of oscillation may be varied without a significant deviation from a standard system design. This is possible because most of the components of the cushioning system are modular between different suspension systems irrespective of the natural frequency of oscillation. The natural frequency of oscillation may be increased or decreased just by changing the ratio of the effective areas of the cylinders.

Still another object of this invention is to design a cushioning system in which a height adjustment may be made by adding or withdrawing air from the system, yet in which variable damping is possible. Normally, variable damping is restricted to hydraulic cushioning systems. This is because variable damping is achieved by positioning an adjustable restriction in the flow path of the hydraulic fluid. If the restriction is partially removed, less damping of the system occurs. If the restriction is increased, the damping characteristic of the hydraulic system increases accordingly. Variable damping is a valuable feature when the vehicle concerned is subject to different conditions of travel at various times. That is, a large amount of damping is generally desirable if the vehicle is to travel over a rough road or over open terrain. Conversely, when the same vehicle is traveling over a smoother surface, less damping is ordinarily desirable in order to produce a smoother ride.

In a broad aspect, this invention is a vehicle occupant support suspension system comprising in combination: a vehicle frame; an occupant support vertically movable with respect to said vehicle frame; a first hydraulic cylinder interposed between said vehicle frame and said occupant support; a second hydraulic cylinder having a fixed member and a movable member; a hydraulic connection line interconnecting said first hydraulic cylinder and said second hydraulic cylinder; and an air cushion having a fixed portion and a movable portion, and said movable portion of said air cushion and said movable member of said second hydraulic cylinder move together in response to pressure both in said second hydraulic cylinder and in said air cushion.

Preferably, there is an adjustable throttle valve positioned in the hydraulic connection line between the first and second hydraulic cylinders. The addition of this adjustable throttle valve introduces the feature of variable damping into the occupant support suspension system.

One preferred construction of this invention exists where the movable member of the second hydraulic cylinder is hollow and has first and second ends, and there is an axial opening in said first end into which the fixed member of the second hydraulic cylinder extends. The movable portion of the air cushion is attached to the second end of the movable member of the second hydraulic cylinder.

Embodiments of this invention are more clearly illustrated in the accompanying drawings in which.

Figure 1:
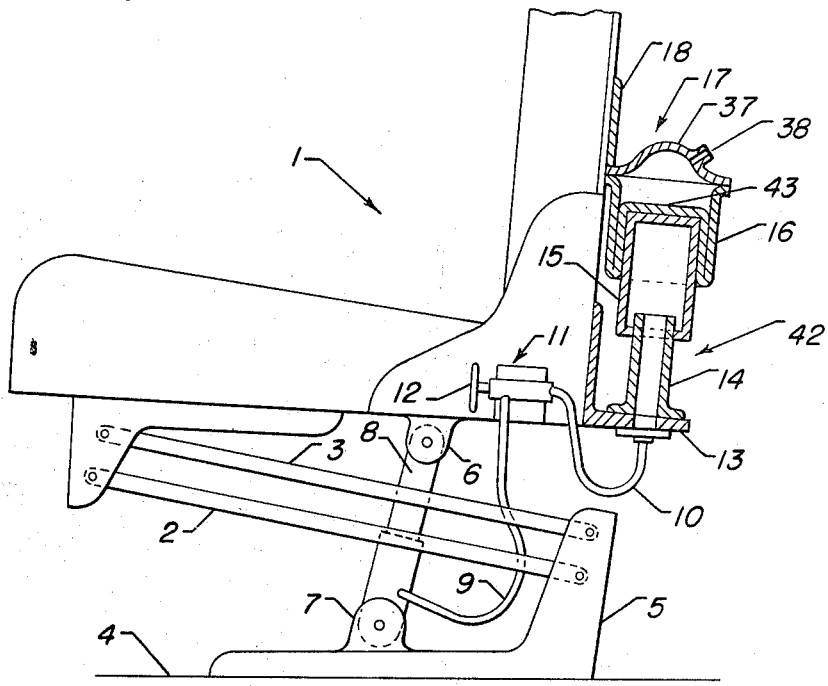
FIG. 1 is an elevational view in partial section of a vehicle seat employing one preferred embodiment of this invention.

Referring now to FIG. 1, there is shown a vehicle seat 1 serving as an occupant support. The vehicle seat 1 is supported relative to vehicle frame 4 by means of the suspension system of this invention. The suspension linkage depicted is of the conventional parallelogram construction. That is, parallel links 2 and 3 on each side of the vehicle seat attach the vehicle seat to the suspension base 5, which is rigidly connected to vehicle frame 4. The motion of seat 1 is guided by the links 2 and 3 so that vehicle seat 1 is vertically movable with respect to vehicle frame 4.

A first hydraulic cylinder 8 is interposed between the vehicle seat 1 and the base 5 attached to vehicle frame 4. The lower end of the first hydraulic cylinder 8 is pivotally connected to base 5 by means of brackets 7 while the upper end of first hydraulic cylinder 8 is pivotally connected to the underside of the seat pan of seat 1 by means of brackets 6. While the vehicle is in motion, the suspension links 2 and 3 move counterclockwise for a short distance as the vehicle seat 1 begins the downward half of its oscillatory cycle. As links 2 and 3 move counterclockwise, the piston within the first hydraulic cylinder 8 forces fluid out of first hydraulic cylinder 8 and through the hydraulic connection line 9 as the first hydraulic cylinder 8 is compressed. At the lowest point in the oscillatory cycle, the pressure in air cushion 17 causes the hydraulic fluid to flow back through the hydraulic connection line 9 into the chamber or cylinder portion of the first hydraulic cylinder 8. This causes the links 2 and 3 to change their direction of motion and rotate a short distance clockwise. When seat 1 reaches the highest point in its oscillatory cycle, the process is reversed.

The hydraulic connection line is made up of segments 9 and 10 which are connected together by an adjustable throttle valve 11 positioned in the hydraulic connection line. Segment 10 of the hydraulic connection line leads from the adjustable throttle valve 11 to a second hydraulic cylinder 42 having a fixed member 14 and a movable member 15. The fixed member 14 is rigidly mounted with respect to the vehicle seat back by means of a lower bracket 13 shown attached to the vehicle seat back. Also shown attached to the vehicle seat back is an air cushion 17. Air cushion 17 is comprised of a fixed portion and a movable portion. The fixed portion of air cushion 17 is made up of a rigid dome 37 to which is welded a mounting support 18. Mounting support 18 is in turn attached to the vehicle seat back. The movable portion of air cushion 17 is comprised of the end section 43 of an airtight, flexible sleeve 16. Movable member 15 of the second hydraulic cylinder 42 has a first end and a second end. The movable member 15 is hollow and has an axial opening in its first end into which the fixed member 14 of the second hydraulic cylinder extends. Movable member 15 of the second hydraulic cylinder travels back and forth along the length of fixed member 14 in response to pressure changes within the second hydraulic cylinder and within the air cushion 17. The end section 43 of sleeve 16 is attached to the second end of movable member 15 so that movable member 15 of second hydraulic cylinder 42 and movable portion 43 of air cushion 17 move together in response to pressure both in second hydraulic cylinder 42 and in air cushion 17. Sleeve 16 is doubled back upon itself to accommodate the protrusion of movable member 15 into the air cushion.

The height of the median or ride position of the seat 1 may be varied by introducing or withdrawing air or other gas through valve 38 in the dome 37. To increase the height of the seat 1 during the ride position, air is introduced into the air cushion 17 through valve 38. Conversely, to lower the ride position of seat 1, air is withdrawn through valve 38. Since the area of air cushion piston member or end section 43 is greater than the area of piston 14, air from relatively low pressure conventional vehicle air supplies or from a service station supply can be used in the air cushion 17 while allowing higher pressures to be experienced by the hydraulic fluid in the second hydraulic cylinder 42.

As the seat 1 oscillates with respect to vehicle frame 4, hydraulic fluid travels to and from the first hydraulic cylinder 8 through the adjustable throttle valve 11. If the vehicle is traveling over rough roads or broken terrain, the vehicle occupant can increase the damping characteristics of the suspension system by turning the thumb screw 12 to constrict the flow of hydraulic fluid through the adjustable throttle valve 11. This will give the vehicle occupant a harder ride since the fluid flow to and from first hydraulic cylinder 8 is restricted, as is the expansion and contraction of first hydraulic cylinder 8. When the vehicle is traveling over smoother roads, the vehicle operator turns the thumb screw 12 so that the restriction of the flow of hydraulic fluid through valve 11 is eased. This allows the hydraulic fluid to flow more freely into and out of the first hydraulic cylinder 8, thereby softening the ride. Under such driving conditions, the shocks and vibrations experienced by the vehicle are generally not severe enough to cause an unpleasantly large amplitude of oscillation of the seat 1.

As the seat 1 begins moving downward in its cycle of oscillation, hydraulic fluid is forced from first hydraulic cylinder 8 through hydraulic connection line segment 9, valve 11, hydraulic connection line segment 10, through a passageway in lower bracket 13, and into the fixed member 14 of the second hydraulic cylinder 42. From fixed member 14, fluid is forced into movable member 15, thereby causing movable member 15 to move upward carrying end section 43 closer to the dome 37 of the air cushion 17. This motion causes flexible sleeve 16 to further double back upon itself against the outer wall of movable member 15. The upward movement of movable element 15 continues until the air pressure within the air cushion 17 overcomes the momentum of the seat 1. The compressed air in air cushion 17 then forces movable end section 43 and movable member 15 downward thereby unfolding flexible element 16. This decreases the space available within movable element 15, thereby forcing hydraulic fluid back through the connection line sections 10 and 9 and into first hydraulic cylinder 8.

The same interaction of system components is repeated each time the vehicle seat 1 experiences a complete cycle of oscillation. As has been discussed, the ride position of the seat 1 may be varied by changing the quantity of gas within the air cushion 17 by introducing or withdrawing gas through valve 38. Another manner of making a height adjustment is by withdrawing hydraulic fluid from the suspension system. This can be done by withdrawing thumb screw 12 from valve 11 and forcing hydraulic fluid completely out of the system.

While the term "air cushion" has been used to describe a chamber of variable volume containing a compressible fluid, any gas may be used in the cushion, and nitrogen is frequently used to avoid the possibility of an explosion in the gas containing cushion. The terms "fixed member" and "fixed portion" have been used to describe a component of the second hydraulic cylinder and of the air cushion respectively. As is apparent from the illustrations, the fixed member of the second hydraulic cylinder and the fixed portion of the air cushion need only be fixed relative to each other, and both may move relative to the seat, to the vehicle frame, or to any other system component.

Figure 2:
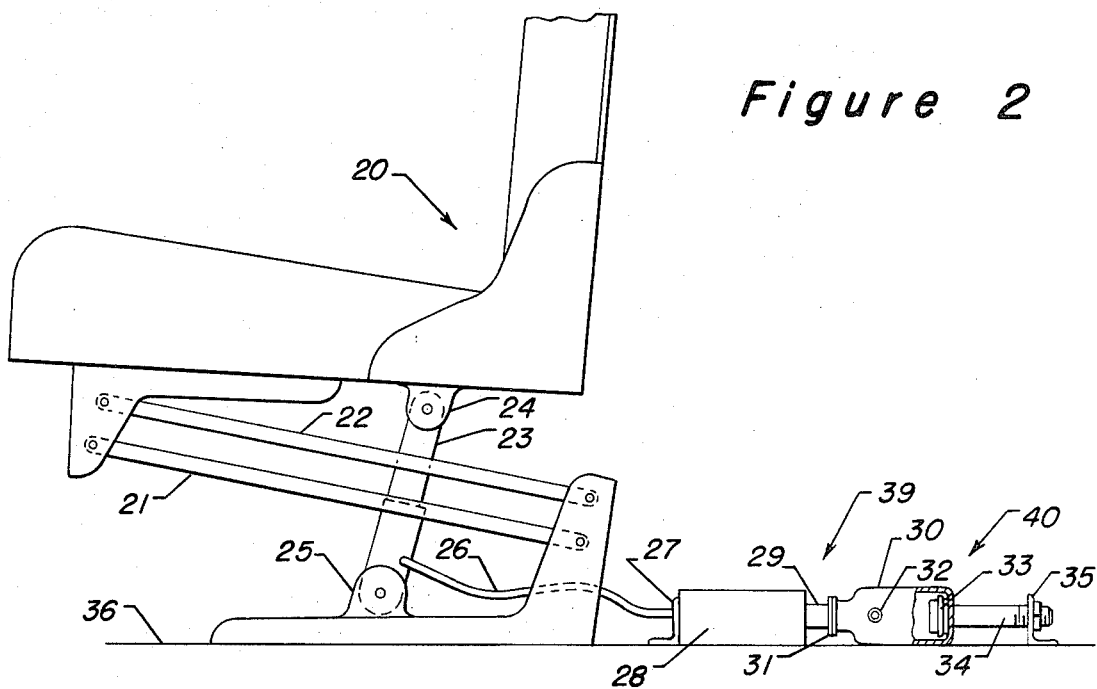
FIG. 2 is an elevational view in partial section of another embodiment of this invention as utilized with a vehicle seat.

FIG. 2 illustrates an alternative form of this invention. In FIG. 2, there is an occupant support in the form of a seat 20 that is vertically movable with respect to a vehicle frame 36. Motion of the seat 20 is controlled relative to vehicle frame 36 by means of the parallel links 21 and 22 on each side of the seat 20. This arrangement is identical to that of FIG. 1. A first hydraulic cylinder 23 is interposed between the seat 20 and the vehicle frame 36. First hydraulic cylinder 23 is pivotally attached to the underside of the seat and to the vehicle frame by pivot brackets 24 and 25. Leading from first hydraulic cylinder 23 is a hydraulic connection line 26 interconnecting the first hydraulic cylinder 23 and a second hydraulic cylinder 39. The cylinder or chamber end 28 of second hydraulic cylinder 39 is attached to the vehicle frame 36 by means of an anchoring flange 27. Second hydraulic cylinder 39 is comprised of a fixed chamber member 28 and a movable piston member 29. Movable piston member 29 has first and second ends. The first end forms a piston which reciprocates within the fixed chamber member 28. To the second end of movable piston member 29 is attached a movable portion 30 of an air cushion 40. Air cushion 40 is an air cylinder comprised of a fixed piston portion 34 and movable portion 30 in the form of a hollow chamber into which fixed piston portion 34 extends. The movable piston member 29 and chamber portion 30 are attached to each other by means of an annular steel band 31. A similar annular steel band 33 on the inside of chamber portion 30 is tightened around an end of chamber portion 30 and around piston portion 34 of air cylinder 40 to prevent portions 30 and 34 of the air cylinder 40 from becoming disengaged. Fixed piston portion 34 is rigidly attached to vehicle frame member 36 by means of a support angle 35. It can therefore be seen that the fixed member 28 and fixed portion 34 of the second hydraulic cylinder 39 and air cylinder 40, respectively, are fixed relative to each other even though they move in an absolute sense as the vehicle is subjected to shocks and vibrations.

The operation of the embodiment of the invention in FIG. 2 is very similar to that of FIG. 1. As the seat 20 approaches the vehicle frame 36 in the downward stroke of the oscillatory cycle, hydraulic fluid is forced from first hydraulic cylinder 23 through hydraulic connection line 26 and into the chamber member 28 of second hydraulic cylinder 39. The increase in volume of the incompressible hydraulic fluid in chamber member 28 forces piston member 29 to the right. Because movable piston member 29 and movable chamber portion 30 of the air cylinder move together, this increase in volume in the chamber member 28 causes movable chamber portion 30 to move to the right. The result is that fixed piston portion 34 occupies more and more of the interior space of chamber portion 30 of the air cylinder 40. This increases the compressed air pressure within chamber portion 30 until the pressure in chamber portion 30 overcomes the momentum of the seat 20. At this point chamber portion 30 and piston member 29 reverse their direction of motion. The piston 29 of second hydraulic cylinder member 39 is thereby forced back into chamber member 28. This forces hydraulic fluid through hydraulic connection line 26 into the first hydraulic cylinder 23. This increase in volume within hydraulic cylinder member 23 causes hydraulic cylinder member 23 to expand, thereby forcing seat 20 into the ascending portion of its oscillatory cycle.

To increase or decrease the ride position of seat 20, air or other gas may be introduced to or withdrawn from chamber member 30 of air cylinder 40 by means of valve 32. It can be seen that the embodiment of this invention of FIG. 2 does not provide for variable damping, as there is no valve positioned in the hydraulic connection line 26.

Common to both of the embodiments depicted is the concept of removing many of the occupant support suspension system elements from beneath the occupant support. This alleviates the problem of crowding suspension system components into the space beneath the occupant supports. This is a common problem in conventional vehicles.

While this invention is designed primarily for seat suspensions, it is equally appropriate for use when the entire cab or upper portion of the vehicle serves as an occupant support.

The foregoing detailed descriptions and illustrations of alternative embodiments of this invention have been given for clearness of understanding only, and no unnecessary limitations should be construed therefrom, as other modifications will be obvious to those skilled in the art of vehicular seating.

I claim as my invention:

1. A vehicle occupant support suspension system comprising in combination:
   a. a vehicle frame;
   b. an occupant seat support frame vertically movable with respect to said vehicle frame;
   c. first hydraulic cylinder and piston means defining a first chamber interposed between said vehicle frame and said occupant support frame;
   d. second hydraulic cylinder and piston means including a fixed member and a movable member and defining a second chamber, said movable member being hollow and having first and second ends, said first end including an axial opening into which said fixed member extends;
   e. a hydraulic connection line interconnecting said first and second chambers;
   f. air cushion means including a fixed portion and a movable portion defining a third chamber, one of said portions including a piston, the said movable portion of said air cushion and the said second end of said movable member of said second hydraulic cylinder and piston means being affixed to each other and operatively associated to move together in response to pressure changes in either of said second or third chambers, the fixed portion of said air cushion means and the fixed member of said second hydraulic cylinder and piston means being mounted on one of said frames, the effective area of the piston portion of said air cushion being greater than the area of the piston portion of said second hydraulic cylinder and piston means; and,
   g. means communicating with at least one of said chambers for permitting fluid to be added to or removed therefrom.

2. A vehicle occupant support suspension system comprising in combination:
   a. a vehicle frame;
   b. an occupant seat support frame vertically movable with respect to said vehicle frame;
   c. first hydraulic cylinder and piston means defining a first chamber interposed between said vehicle frame and said occupant support frame;
   d. second hydraulic cylinder and piston means including a fixed member and a movable member and defining a second chamber, said movable member having first and second ends, said first end forming a movable piston member for said second hydraulic cylinder;
   e. a hydraulic connection line interconnecting said first and second chambers;
   f. air cushion means including a fixed portion and a movable portion defining a third chamber, said fixed portion including a piston, the said movable portion of said air cushion and the said second end of said movable member of said second hydraulic cylinder and piston means being affixed to each other and operatively associated to move together in response to pressure changes in either of said second or third chambers, the fixed portion of said air cushion means and the fixed member of said second hydraulic cylinder and piston means being mounted on one of said frames, the effective area of the piston portion of said air cushion being greater than the area of the piston portion of said second hydraulic cylinder and piston means; and,
   g. means communicating with at least one of said chambers for permitting fluid to be added to or removed therefrom.

\* \* \* \* \*